United States Patent [19]

Nakao et al.

[11] Patent Number: 5,020,041
[45] Date of Patent: May 28, 1991

[54] MAGNETO-OPTICAL MEMORY APPARATUS HAVING A FLOATING MAGNETIC HEAD

[75] Inventors: Takeshi Nakao, Sagamihara; Masahiro Ojima, Tokyo; Yoshinori Miyamura, Tokyo; Toyoji Okuwaki, Tokyo; Youichi Kawakubo, Tokorozawa; Yoshinori Takeuchi, Ibaraki; Yuzo Yamaguchi, Tsuchiura, all of Japan

[73] Assignee: Hitachi, Ltd., Tokyo, Japan

[21] Appl. No.: 153,094

[22] Filed: Feb. 8, 1988

[30] Foreign Application Priority Data

Mar. 6, 1987 [JP] Japan .................. 62-50040

[51] Int. Cl.⁵ .................. G11B 13/04; G11B 11/12
[52] U.S. Cl. .................. 369/13; 360/114
[58] Field of Search .................. 369/13, 14, 116; 360/59, 114, 133; 365/122

[56] References Cited

U.S. PATENT DOCUMENTS

| | | |
|---|---|---|
| 4,340,914 | 7/1982 | Hanaoka .................. 360/59 |
| 4,706,232 | 11/1987 | Funada et al. .................. 369/13 |
| 4,737,947 | 4/1988 | Osato et al. .................. 365/122 |
| 4,794,480 | 12/1988 | Jones et al. .................. 360/133 |
| 4,796,241 | 1/1989 | Hayakawa et al. .................. 369/13 |
| 4,805,043 | 2/1989 | Doyle .................. 360/59 |
| 4,849,952 | 7/1989 | Shiho .................. 369/13 |

FOREIGN PATENT DOCUMENTS

| | | |
|---|---|---|
| 0153676 | 9/1985 | European Pat. Off. . |
| 57-06446 | 1/1982 | Japan .................. 369/14 |
| 57-60566 | 4/1982 | Japan .................. 369/14 |
| 57-94906 | 12/1982 | Japan .................. 360/114 |
| 60-261052 | 12/1985 | Japan .................. 369/13 |
| 61-39251 | 2/1986 | Japan .................. 369/13 |
| 62-75954 | 4/1987 | Japan .................. 360/114 |

OTHER PUBLICATIONS

Iwabuchi, Patents Abstracts of Japan, p. 475, vol. 10, No. 19, Jul. 9, 1986, "Magnetic Recording Optical Reproducing Device".

Ogawa, "Optical head for Optomagnetic Disc", Patents Abstracts of Japan, p. 459, vol. 10, No. 14, May 27, 1986.

Hartman et al., "Erasable Magneto-Optical Recording Media", IEEE Trans. Magnetics, MAG-20, vol. 5, p. 1013 (1984).

Primary Examiner—Stuart S. Levy
Assistant Examiner—Hoa Nguyen
Attorney, Agent, or Firm—Antonelli, Terry, Stout & Kraus

[57] ABSTRACT

A magneto-optical memory apparatus has an optical head for applying a light to a substrate of a recording medium such as a magneto-optical disk having a magneto-optical recording film formed on the substrate and continuously applying a high power laser beam in a record mode, and a floating magnetic head arranged on the opposite side of the recording medium to the side of the optical head and adapted to be kept at a substantially constant distance from the recording medium by an air pressure created between the magnetic head and the recording medium by the movement of the recording medium, for applying, in the record mode, a magnetic field which is polarity-inverted or intensity-modulated according to information to be recorded, to the magneto-optical recording film.

23 Claims, 8 Drawing Sheets

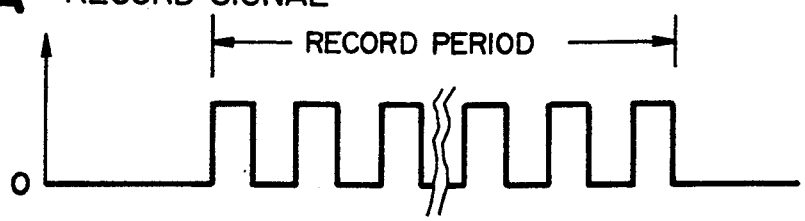
FIG. 2A RECORD SIGNAL
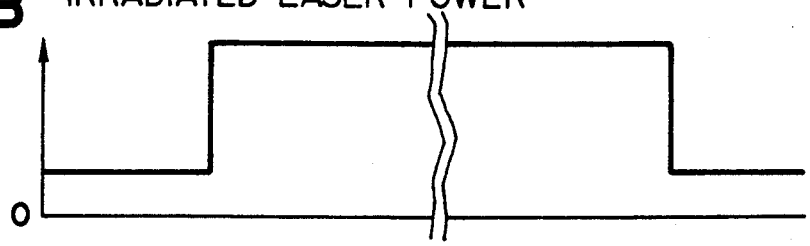
FIG. 2B IRRADIATED LASER POWER
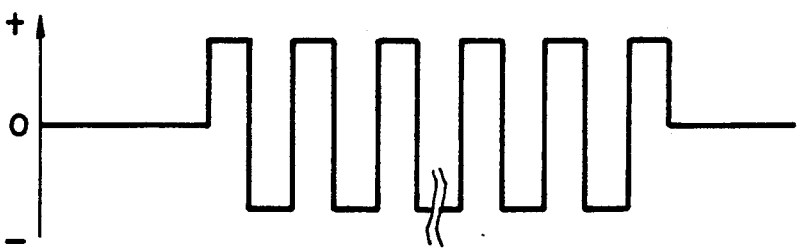
FIG. 2C APPLIED MAGNETIC FIELD
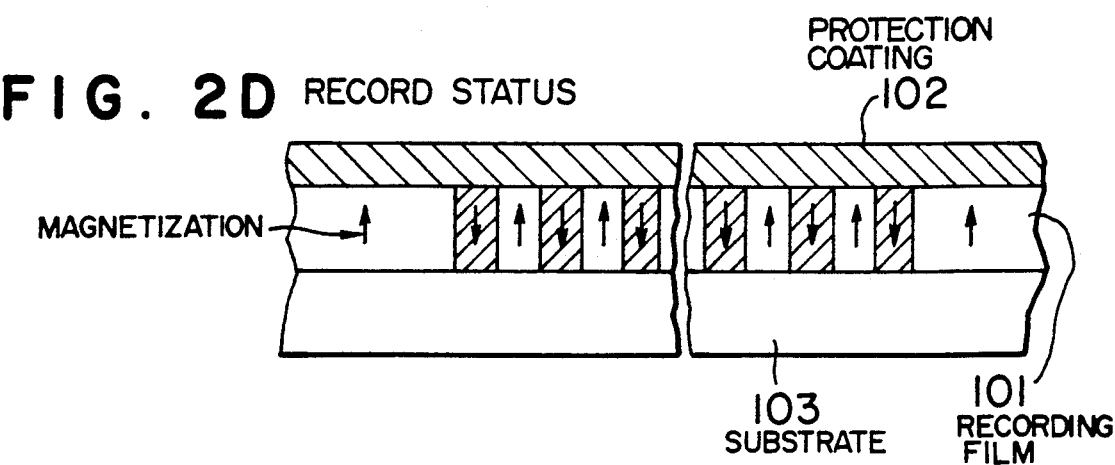
FIG. 2D RECORD STATUS

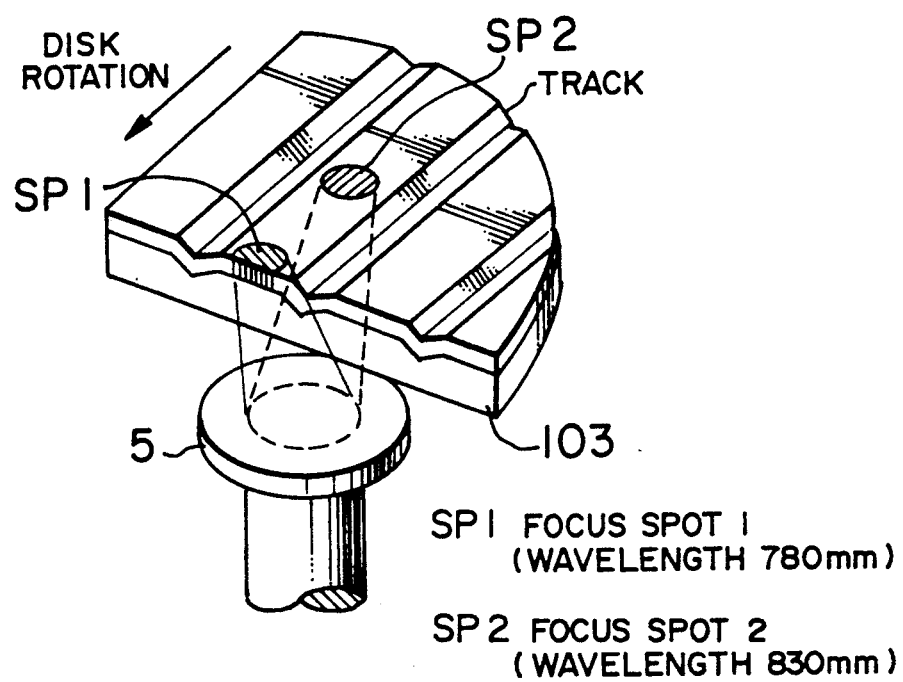
FIG. IIB

MAGNETO-OPTICAL MEMORY APPARATUS HAVING A FLOATING MAGNETIC HEAD

BACKGROUND OF THE INVENTION

The present invention relates to a magneto-optical memory apparatus, and more particularly to a magneto-optical disk apparatus which permits overwriting by a magnetic field modulation method.

The prior art overwritable magneto-optical disk apparatus uses two light spots as disclosed in IEEE Transaction on Magnetics, MAG 20, Vo. 5, page 1013 (1984) or a magnetic field modulation system in which a magnetic field applied to a record film is modulated with information to be recorded as disclosed in JP-A-51-107121, JP-A-59-215008 and JP-B-60-48806. The present invention relates to the overwritable magneto-optical memory apparatus of the latter or magnetic field modulation system.

In the prior art overwritable magneto-optical apparatus by the magnetic field modulation system, a magnetic field generating electromagnetic coil is mounted on a disk to apply the modulation magnetic field. In such a prior art apparatus, a spacing between the disk and the magnetic field application means such as electromagnetic coil cannot be reduced in order to prevent the disk from contacting to the magnetic field application means by fluctuation of the disk and the spacing is fixed to a value between 0.1 mm and 0.5 mm. As a result, if the disk fluctuates as the disk rotates, the spacing between the electromagnetic coil and the disk varies and the magnetic field intensity applied to the record film varies as the record film is moved. Since a high magnetic field is required, it is difficult to modulate it at a high speed and hence a recording frequency is lower than 0.5 MHz. As a result, the record density (line record density) is low.

A magneto-optical memory apparatus of a light modulation type in which the magnetic field applied to the record film is fixed and an intensity of an irradiated laser beam is modulated with the record information is known. However, this type of apparatus does not permit overwriting. It is disclosed in U.S. patent application Ser. No. 932,578 filed on Nov. 20, 1986 by some of the inventors of the present invention, now U.S. Pat. No. 4,803,674.

SUMMARY OF THE INVENTION

It is a first object of the present invention to provide a magneto-optical memory apparatus which can record a signal of several MHz and has an overwriting capability which is an advantage of a magnetic memory apparatus and high record density and large capacity feature which are advantages of an optical memory apparatus.

It is a second object of the present invention to provide a magneto-optical memory apparatus in which a magnetic field intensity applied to a record film does not essentially vary as the record medium is moved and which can stably record high record density information.

It is a third object of the present invention to provide a magneto-optical memory apparatus having a floating magnetic head which has no head crash and is operable in atmosphere.

It is a fourth object of the present invention to provide a magneto-optical memory apparatus having a floating magnetic head which may have a highly durable protection coating, is insensitive to environment and is highly reliable.

The magneto-optical memory apparatus of the present invention is characterized in that an optical head and a magnetic head are arranged to face each other on the opposite sides of a record medium, and the magnetic head is of floating type. A light is irradiated by the optical head to a substrate of the record medium, and a magnetic field is applied by the magnetic head to a magneto-optical record film.

The floating magnetic head floats by an air pressure created between the head and the record medium by the movement of the recording medium, and a float height is substantially constant. Accordingly, the magnetic head follows the fluctuation of the recording medium and the spacing between the magnetic head and the recording medium is maintained substantially constant during the operation. The floating magnetic head comprises a head core having a wide effective magnetic field area and a slider which exhibits a large floating height at a low disk speed. The effective magnetic field area of the head core is preferably 50 $\mu$m×50 $\mu$m to 1 mm×1 mm, and more preferably 50 $\mu$m×50 $\mu$m to 0.2 mm×0.5 mm, for the easy alignment of a light spot and the magnetic head. The floating height may be as small as possible from a standpoint of recording density, but it is preferably 1 $\mu$m to 100 $\mu$m, and more preferably 2 $\mu$m to 10 $\mu$m in order to prevent head crash by dust.

In accordance with another feature of the present invention, a highly durable protection coating is formed on a side of the magneto-optical recording film which faces the magnetic head, with a thickness of 1-20 $\mu$m.

The floating magnetic head used in the present invention has an effective magnetic field applying area which is much wider than that of the prior art magnetic head. If the effective magnetic field area is as wide as 0.2 mm×0.5 mm, it is easy to align the focusing spot and the magnetic field, and the alignment hardly changes even if the temperature change or vibration happens. When the floating height is more than 1 $\mu$m, head crash by dust does not take place and the apparatus may be used in atmosphere. When the head core having a wide effective magnetic field area is used, the magnetic field strength does not substantially decrease even at a point spaced by 10–20 $\mu$m from the surface of the head core, a thick protection layer having a thickness of 5–10 $\mu$m may be formed on the surface of the magneto-optical recording film. Since the protection coating may be coated for the exclusive purpose of protection and need not include a magnetic component as required in the prior art magnetic disk, the durability of the protection coating is very high, and the resistance to the environment and the reliability are further improved.

Information is recorded by irradiating a high power laser beam by the optical head to the substrate of the magneto-optical recording film and applying a modulation magnetic field inverted in accordance with information to be recorded by the floating magnetic head to the magneto-optical recording film. In this manner, a new signal can be overwritten while an old signal is erased. The recording density is determined by a size of a light spot and a frequency of the applied modulation magnetic field. Thus, a magneto-optical memory apparatus which has high density and large capacity features of the optical disk as well as the overwrite feature of the magnetic disk without losing a non-contact feature of the optical recording is attained.

BRIEF DESCRIPTION OF THE DRAWINGS

FIGS. 2A to 2D illustrate information recording operations in the present invention, FIGS. 11A and 11B show a second embodiment of the present invention.

DESCRIPTION OF THE PREFERRED EMBODIMENT

Figure 1:
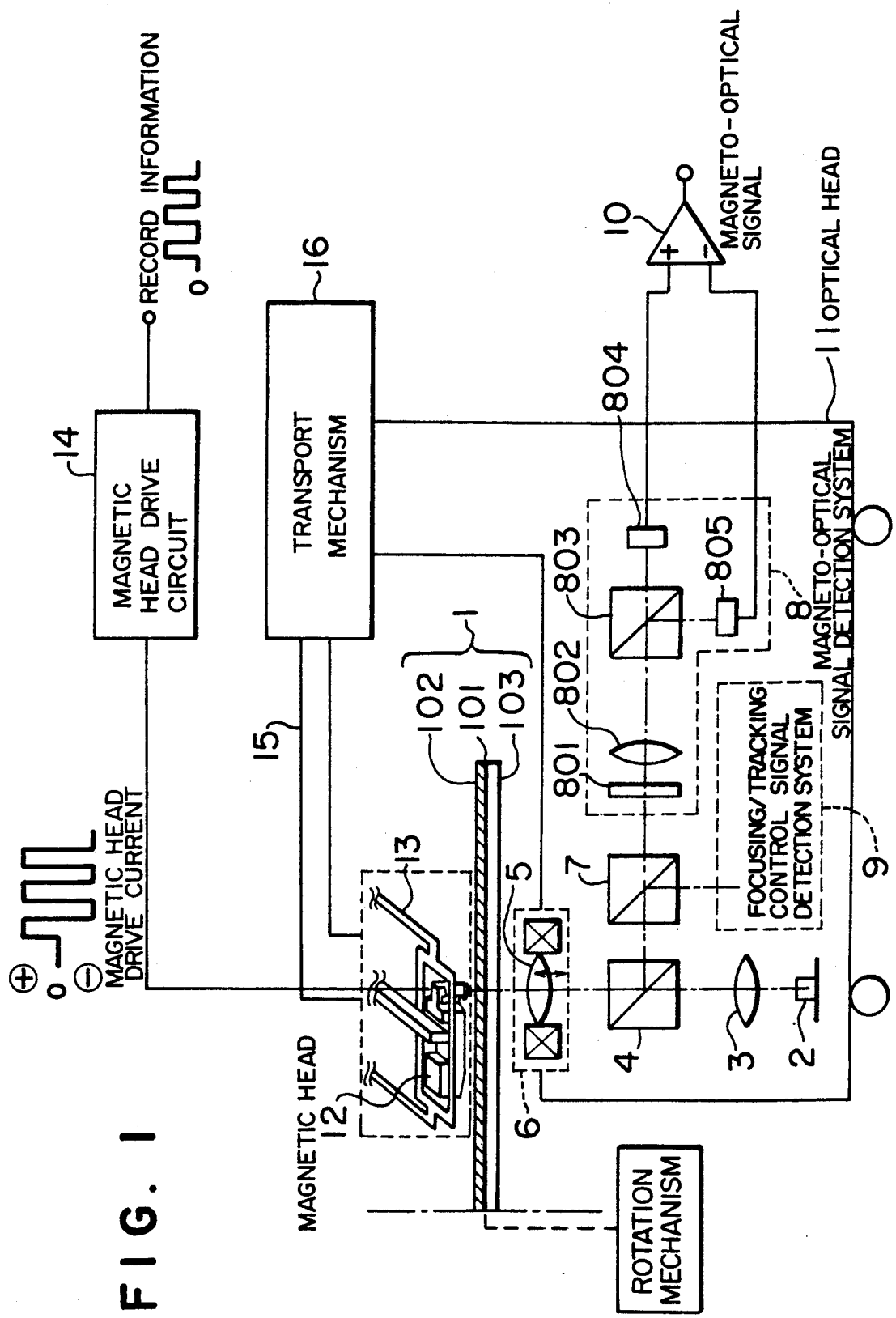
FIG. 1 shows a first embodiment of the present invention.

A first embodiment of the present invention is explained with reference to FIG. 1. Numeral 1 denotes a magneto-optical disk which is a rotating recording medium and has a magneto-optical recording medium 101 having a magneto-optical effect and a protection layer 102 formed on a disk-shaped transparent substrate 103. The magneto-optical disk is rotated by a rotation mechanism such as a rotary motor. A light emitted from a light source which is a semiconductor laser 2 is collimated by a collimeter lens 3 and directed to a focusing lens 5 through a beam splitter 4. The light beam focused by the lens 5 is directed to the substrate 103 of the disk to form a fine spot of approximately 1 $\mu$m in diameter on the recording film 101. The focusing lens 5 is mounted on an actuator 6 such that it follows the fluctuation of the disk 1 to always maintain the focus point on the recording film, and follows the eccentricity of the information recording track on the disk to always bring the spot onto a desired track. A light reflected by the disk 1 passes through the focusing lens 5, is reflected by a beam splitter 4, and directed to a magneto-optical signal detecting optical system 8 and a light point control signal detecting optical system 9 for detecting defocusing and off-track, by a beam splitter 7.

An arrangement of the magneto-optical signal detection system 8 is shown. It is of differential signal detection system which uses a $\lambda/2$ plate 801 and a polarization beam splitter 803. A light applied to the magneto-optical signal detecting optical system 8 passes through the $\lambda/2$ plate 801 and the lens 802, and separated into polarization components S and P by the polarization beam splitter 803. The polarization components are detected by photo-detectors 804 and 805, respectively, and converted to electrical signals, which are differentiated by a differential amplifier 10, which in turn produces a magneto-optical signal.

A floating magnetic head 12 is arranged on the recording film side which is on the opposite side to the optical head 11 with respect to the disk 1. In FIG. 1, for illustration purpose, the magnetic head is shown in a 90°-rotated position in the disk plane from the actual position and shown as an enlarged view. The floating magnetic head 12 comprises a coil for applying a magnetic field to the recording film and a slider for floating the head assembly, and it floats by an air pressure created by the disk rotation while the disk rotates. Since a floating height is essentially constant, the magnetic head 12 follows the fluctuation of the disk 1 and the spacing between the magnetic head 12 and the disk 1 is kept essentially constant during the operation. The floating height is larger than 1 $\mu$m (preferably larger than 2 $\mu$m). With such a floating height, a head crash by dust, which is a problem encountered in a magnetic disk, does not take place and the apparatus may be used and the medium may be removable in atmosphere.

The magnetic head 12 is forced against the disk 1 by a support spring 13 with a load of 5-10 grams. Either a contact start/stop (CSS) method in which the magnetic head contacts the disk when the disk starts and stops rotation, or a method in which the magnetic disk is separated from the disk until a disk rotation speed reaches a predetermined speed may be used. Whichever method may be used, a mechanism 16 for vertically moving the magnetic head 12 is required when the disk 1 is exchanged.

The floating magnetic head 12 is integrally coupled to the optical head 11 by a support arm 15 so that it moves with the optical head 11 and the distance between both heads is kept constant. The magnetic head is arranged exactly above the light spot on the disk. It is not necessary to integrally couple both heads, but where they are not integrally coupled, means for keeping the distance between the heads constant when the record position is moved radially of the disk and magnetic head move means for moving the magnetic head to a position exactly above the light spot are required.

The optical head 11 is moved radially of the disk by a linear motor or a stepping motor.

FIGS. 2A to 2D illustrate an information recording method. In order to record information, the semiconductor laser 2 is activated to emit a high power continuous light as shown in FIG. 2B to heat the magneto-optical recording film 101 on the disk to approximately Curie temperature so that a coercive force at the irradiated area is reduced. The magnetic head 12 is driven by a magnetic head drive circuit 14 so that a modulation magnetic field (FIG. 2C) inverted according to the information to be recorded (FIG. 2A) is applied to the magneto-optical recording film 101 to record the information. A record status is shown in FIG. 2D. Where an applied magnetic field intensity is to be varied in order to keep a record condition constant in spite of variation of rotation speed of the disk as to its inner or outer periphery or laser output, an intensity modulation is used or a D.C. bias component is added to the magnetic field, in addition to the polarity inversion. When new information is recorded on an already-recorded area, the old information does not remain and the old information can be erased by overwriting.

An embodiment of the floating magnetic head 12 and the disk 1, which are principal components of the invention is explained in detail. The magnetic head 12 is a floating magnetic head which has a large floating height at a low linear speed and a wide effective magnetic field area. To avoid the head crash by dust, the floating height should be more than 1 $\mu$m and preferably more than 2 $\mu$m, and from a standpoint of alignment of the light spot and the magnetic head, the effective magnetic field area of the head core is 50 $\mu$m $\times$ 50 $\mu$m to 1 m to 1 m and preferably 50 $\mu$m $\times$ 50 $\mu$m to 0.2 mm $\times$ 0.5 mm.

Figure 3A:
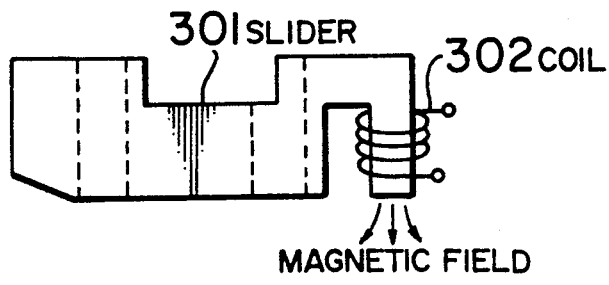
FIGS. 3A to 3E show a magnetic head used in the present invention.
Figure 3B:
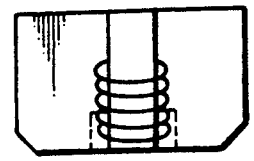
Figure 3C:
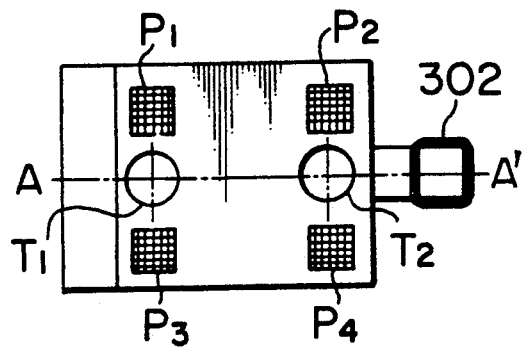
Figure 3E:
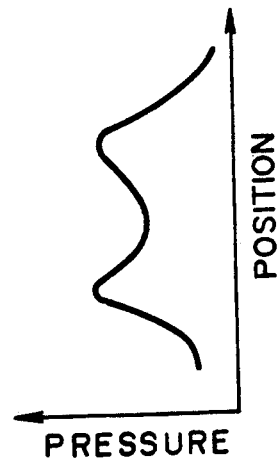
Figure 3D:
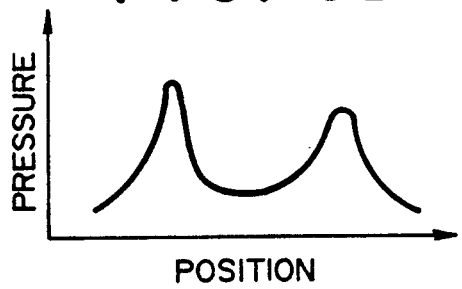
Figure 4A:
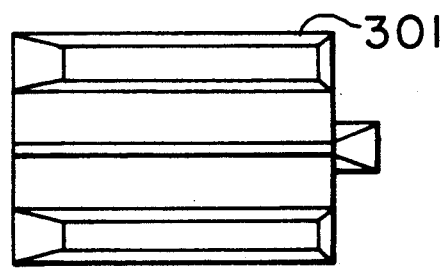
FIGS. 4A to 4C show a prior art magnetic head.
Figure 4C:
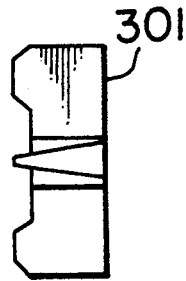
Figure 4B:
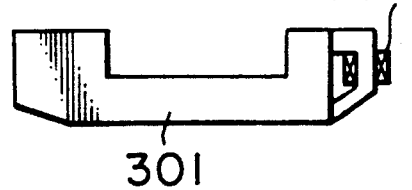
Figure 5:
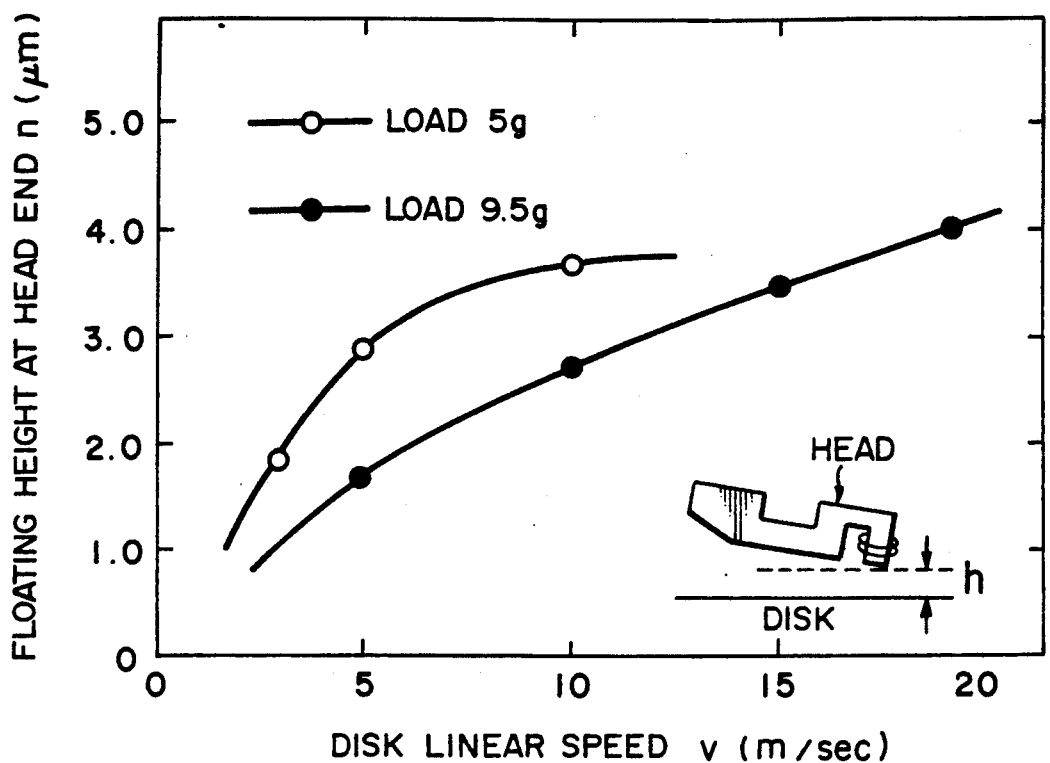
FIG. 5 shows a floating characteristic of the floating magnetic head used in the present invention.
Figure 6A:
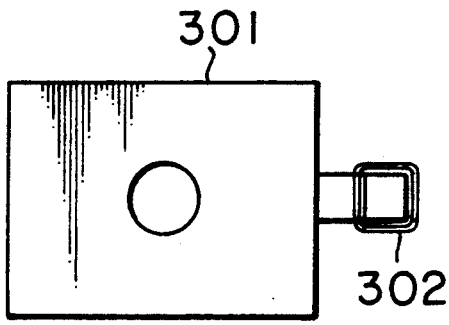
FIGS. 6A, 6B and 7A to 7C show other magnetic heads used in the present invention.
Figure 6B:
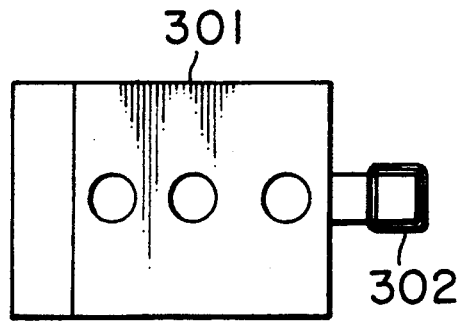

FIGS. 3A to 3E show an embodiment of the floating magnetic head used in the present invention. FIG. 3C shows a slider surface an entire surface which faces the disk is the slider surface, and two essentially circular through-holes $T_1$ and $T_2$ are formed on a center axis AA' of the slider 301 along a direction of travel of the disk. Thus, a slider surface area which contributes to floating is larger than that of a prior art magnetic head shown in FIGS. 4A to 4C and hence the floating height is larger. Air pressure distributions for floating are shown in FIGS. 3D and 3E. Thus, the slider is supported at four points $P_1-P_4$ and it floats stably against pitching or rolling. The through-holes $T_1$ and $T_2$ may be essentially circular recesses. The depth of the recesses is determined to assure the air pressure distributions shown in FIGS. 3D and 3E. With such a slider, where an outer dimension of the slide surface is 3 mm × 4 mm, a diameter of the holes $T_1$ and $T_2$ is 0.6 mm and a load is 5 grams, the floating height of 2 μm is attained at a disk linear speed of 3 m/sec, as shown in FIG. 5. While two circular through-holes or recesses are shown in FIG. 3C, one or three such holes or recesses may be formed as shown in FIGS. 6A and 6B. The shape of the holes or recesses need not be circular but it may be oval or rectangular.

A magnetic field is applied to the recording film by a coil 302 mounted at trailing edge of the slider. A core of the coil is a magnetic material such as Mn—Zn ferrite, and it may be either integral with the slider or the core and the coil may be separately fabricated and coupled to the slider. In the latter case, the slider need not be a magnetic material such as Mn—Zn ferrite but it may be a non-magnetic material such as ceramic.

Where the magnetic material is used as the slider material, a leakage magnetic field of an actuator 6 concentrates to the slide and a net magnetic field intensity applied to the recording film is reduced or the magnetic head may vibrate by mutual action of the magnetic field generated in the magnetic core 302 and the leakage magnetic field. This problem is prevented when the non-magnetic slider is used.

Figure 7A:
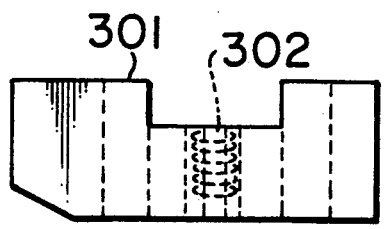
Figure 7B:
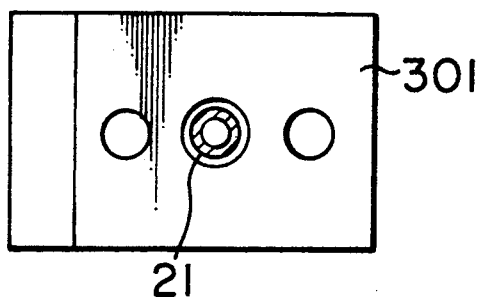
Figure 7C:
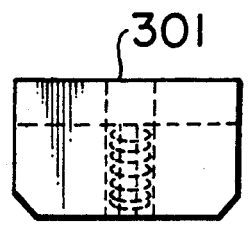

The magnetic field application position need not be at the trailing edge of the slider but it may be in the slider as shown in FIGS. 7A to 7C. It is effective to use nonmagnetic ceramic for the slider 301 and a magnetic material only for the coil core 302, or to use a hollow coil. In the latter case, a total inductance of the magnetic head can be reduced and a frequency response of the magnetic head is improved, as will be explained later.

The effective magnetic field area at the end of the coil is determined by (i) alignment precision of the magnetic head (ii) eccentricity of the disk, and (iii) frequency response of the magnetic head. From the standpoint of (i) and (ii), a large area is required, but the frequency response of (iii) is deteriorated because the inductance increases. For example, 0.2 mm circumferential × 0.5 mm radial to 0.1 mm circumferential × 0.1 mm radial is preferable. In the former case, a record frequency may be 3-5 MHz, and in the latter case, it may be 5-10 MHz.

In the former case, the radial length is larger than the circumferential length so that the light spot does not deviate from the effective magnetic field area even if it moves radially by the eccentricity of the disk. As shown in FIG. 1, the floating magnetic head 12 is fixed to the optical head 11 by the support arm 15 and is moved radially of the disk with the optical head. If a mechanism to follow the eccentricity of the disk is provided in the magnetic head 12, the magnetic field area may be reduced. In this case, however, a position control mechanism for the magnetic head is required in addition to that for the optical head and the apparatus is complex and expensive. In the present embodiment, in order to simplify and reduce cost of the apparatus, the effective magnetic field area has a larger radial length than the circumferential length. Where the optical head is incrementarily moved, by, for example, a stepping motor, the radial movement of the focusing spot is larger than the disk eccentricity and hence the radial length of the effective magnetic field area should be larger than the disk eccentricity. In the magnetic disk or floppy disk, the magnetic field area of the magnetic head corresponds to the record track width, but in the magnetic head used for the magneto-optical disk to the present embodiment, the magnetic field area is 100–200 times as wide as the record track width by the reason described above.

Figure 8:
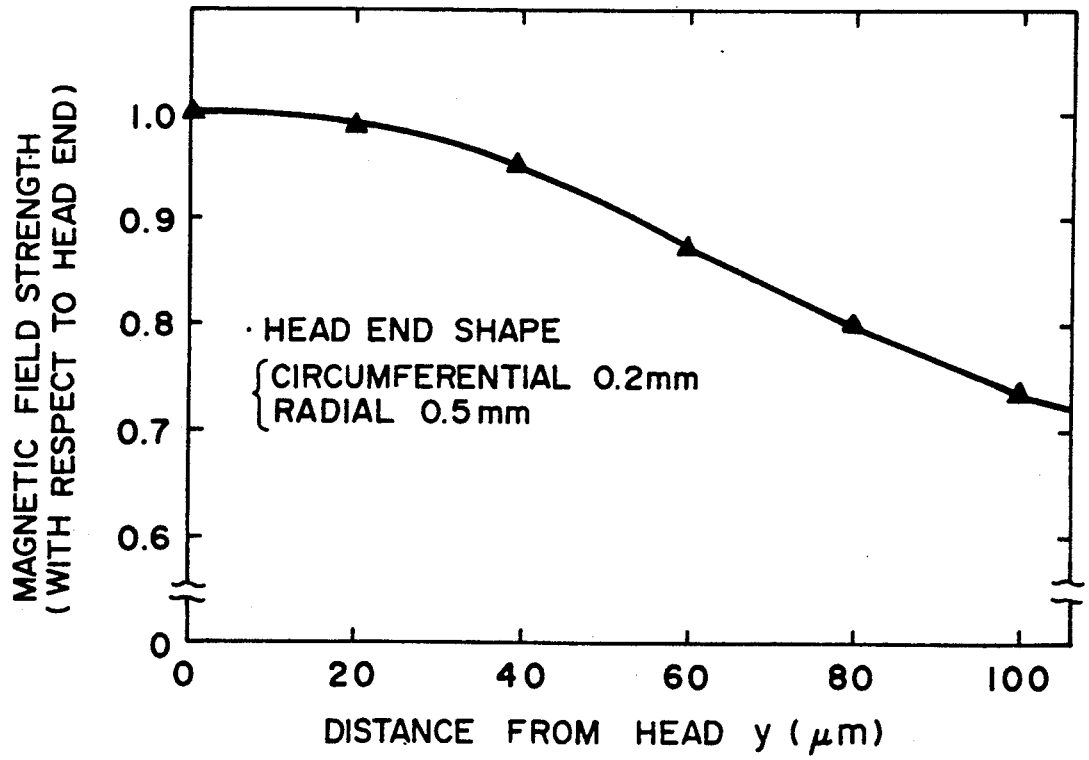
FIG. 8 shows an intensity distribution of a magnetic field generated by the magnetic head used in the present invention.

The magnetic field area of the magnetic head used in the present invention is 50–100 times as wide as that of the magnetic head for the magnetic disk. As a result, a ratio of reduction of a vertical component of the magnetic field to a distance from the head is much smaller than that of the head for the magnetic disk. For example, for a magnetic head having a magnetic field area of 0.5 mm × 0.2 mm, the reduction of the vertical component of the magnetic field at a position spaced from the edge of the head by 20 μm is 2–3%, as shown in FIG. 8.

Where the magnetic field area is wide, the reduction of the magnetic field strength at a position spaced from the surface of the magnetic head by several tens μm may be smaller than that shown in FIG. 8, but the frequency characteristic is deteriorated. In order to achieve the recording frequency of several MHz, the magnetic field area is preferably smaller than 0.5 mm × 0.2 mm and the distance between the magneto-optical recording film and the magnetic head is preferably less than 30 μm. These are important factors in designing a durable disk structure.

Figure 9:
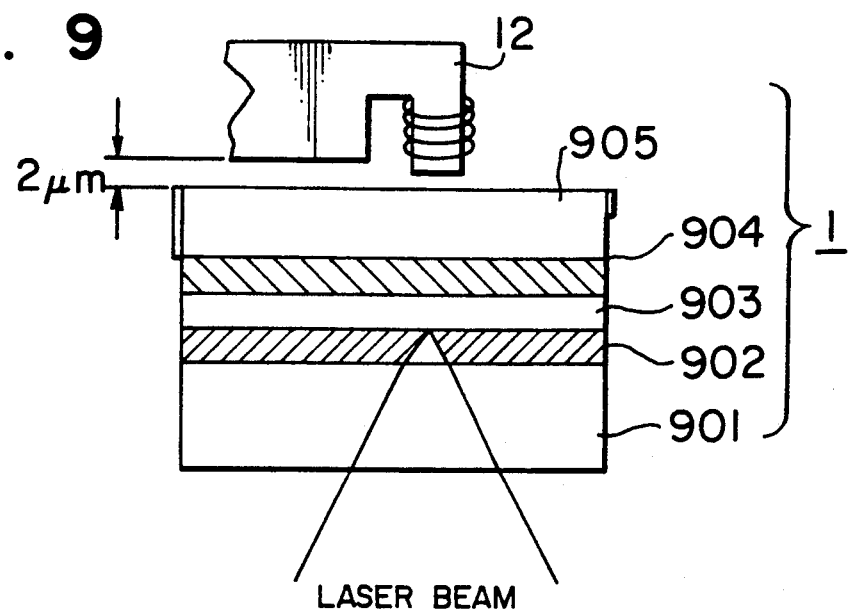
FIG. 9 shows a sectional view of a magneto-optical disk used in the present invention.

FIG. 9 shows an embodiment of the disk 1 used in the present invention. It is a single-side recording disk, and a light is irradiated to a substrate 901 and a magnetic field is applied to a recording film 903. The substrate 901 is a glass or plastic plate having a thickness of approximately 1.2 mm. An enhancement film 902 ($Si_3N_4$ or SiO film having a thickness of approximately 1000 Å) for increasing a Kerr rotation angle is formed on one side of a magneto-optical recording layer 903 (TbFeCO film having a thickness of approximately 1000 Å), and a protection layer 904 ($Si_3N_4$ or SiO layer having a thickness of approximately 2000 Å) for enhancing corrosion resistance and oxidization resistance properties is formed on the other side. A protection coating 905 for enhancing durability to the magnetic head is formed on the protection coating 904 to a thickness of 1–20 μm, and preferably 5–10 μm. Thus, the distance between the recording film 903 and the magnetic head 12 is approximately 10–20 μm. With such a distance, the magnetic field intensity is not reduced as shown in FIG. 8.

The protection coating 905 may be an ultraviolet curing resin. A filler such as $Al_2O_3$ or lubricant may be mixed in the ultraviolet curing resin. The result of pass test reveals that more than one million passes had virtually no influence on write/read characteristics. Furthermore, a pin-on-disk test also revealed that more than one million passes made little damage to the protection layer. In the magneto-optical disk, the record, reproduce and erase characteristics are not affected so long as a defect or break does not reach the recording film. Accordingly, the protection coating may be thick as described above so that the disk durability and the environmental resistance are enhanced and the reliability of the apparatus is improved.

Figure 10A:
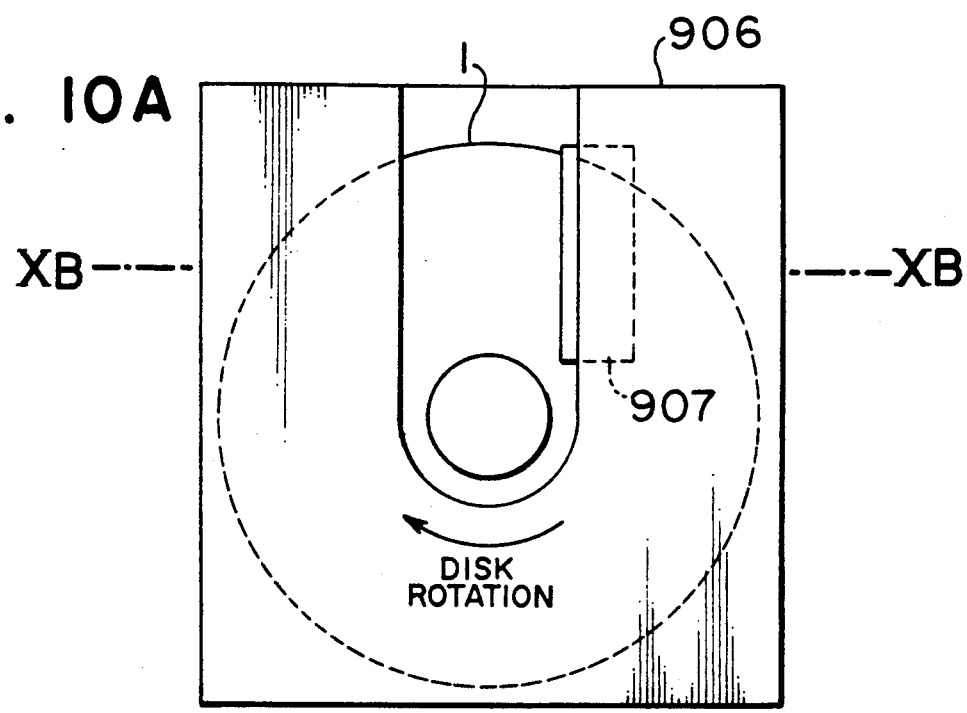
FIGS. 10A and 10B show structures of a disk cartridge.
Figure 10B:
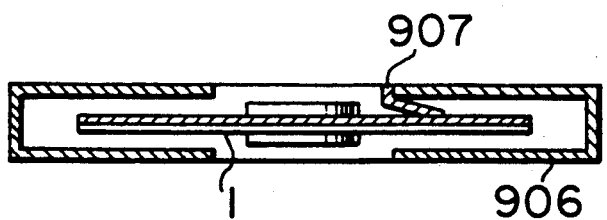

The disk 1 is exchangeable and housed in a cartridge 906 shown in FIGS. 10A and 10B. A dust proof mechanism 907 such as linen paper for removing dust deposited to the protection coating is provided in the cartridge 906 to face the protection coating of the disk.

Figure 11A:
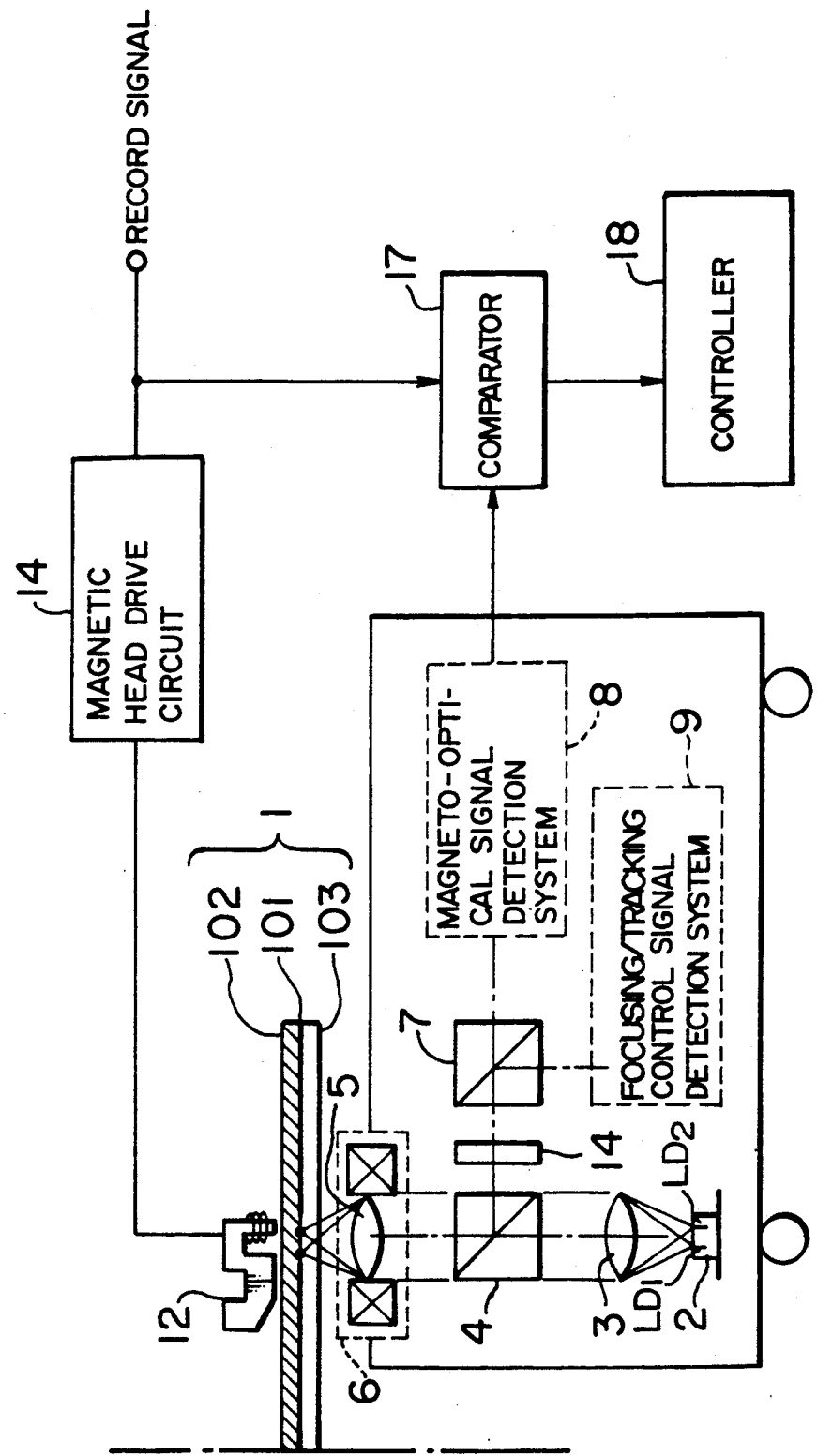

FIGS. 11A and 11B show a second embodiment of the present invention. A laser array having two laser chips mounted in one package is used as the laser light source 2. In FIG. 11, the support spring 13, support arm 15 and magnetic head transport mechanism 16 shown in FIG. 1 are omitted. In FIG. 11A, the positional relationship of the focusing spot on the disk is shown with 90°-rotation in the plane of disk as is done in FIG. 1. The semiconductor laser array having two laser chips LD1 and LD2 of different wavelengths mounted in one package is used as the light source. LD1 is a low power, low noise laser having a wavelength of 780 nm and used to reproduce the magneto-optical signal and control the light point, and LD2 is a high power laser having a wavelength of 830 nm and used to record and erase the signal. The positional relationship of the light spots SP1 (wavelength 780 nm) and SP2 (wavelength 830 nm) formed on the disk by those laser light sources is shown in FIG. 11B. The spot SP2 advances on the track so that the information is recorded by the spot SP2 and an error is checked by the spot SP1. The error check is made by comparing the record signal and the magneto-optical signal reproduced by the spot SP2, by a comparator 17. The comparison result is supplied to a controller 18, which instructs rerecording if the signals are not equal, that is, if an error is detected. In the present embodiment, the input signal to the magnetic head drive circuit 14 is used as a reference signal for comparison although it may be the magnetic head drive current which is the output of the magnetic head drive circuit 14.

In the prior art magneto-optical disk, total of three disk revolutions, one for each of erasing, recording and checking are required to rewrite the information recorded on the disk. In the present embodiment, those three operations are done in one disk revolution and an effective data record time is significantly shortened.

What is claimed is:

1. A magneto-optical memory apparatus comprising:
    a magneto-optical recording medium having a recording film thereon;
    magnetic field application means including modulation means for applying a modulated magnetic field in accordance with information to be recording to said medium;
    an optical head for continuously applying a high power laser light beam to said medium; wherein said magnetic field application means further includes a floating magnetic head arranged on the opposite side of the recording medium to the side of the optical head, the floating magnetic head floating with respect to the recording medium only by air pressure means, and said light beam is applied to a substrate of the recording medium while the magnetic field is applied to the recording film of the recording medium.

2. A magneto-optical memory apparatus according to claim 1 wherein said floating magnetic head has a floating height of at least 1 μm with respect to the recording medium.

3. A magneto-optical memory apparatus according to claim 1 wherein said floating magnetic head has an effective magnetic field area for recording and erasing information of 50 μm×50 μm to 1 mm×1 mm.

4. A magneto-optical memory apparatus according to claim 1 wherein said floating magnetic head has an effective magnetic field area larger in a direction transverse to a direction of a track than in a direction of the track.

5. A magneto-optical memory apparatus according to claim 1 wherein said floating magnetic head has a recording frequency of at least 2 MHz.

6. A magneto-optical memory apparatus according to claim 1 wherein said floating magnetic head has a slider having at least one essentially circular recess or through-hole on a center axis along a direction of travel of the recording medium.

7. A magneto-optical memory apparatus according to claim 1 wherein said floating magnetic head has a slider made of a non-magnetic material.

8. A magneto-optical memory apparatus according to claim 1 wherein said recording medium has the magneto-optical recording film formed only on one side thereof, and a protection coating of 1 μm to 20 μm thick is formed on the recording film.

9. A magneto-optical memory apparatus according to claim 8 wherein said recording medium is removable from the apparatus and housed in a cartridge having a dust proof mechanism arranged to face the protection coating.

10. A magneto-optical memory apparatus according to claim 1 wherein said optical head has a laser array light source having two semiconductor laser chips of different wavelengths, powers and noise characteristic mounted in one package.

11. A magneto-optical memory apparatus according to claim 1 wherein said floating magnetic head has a floating height of 1 μm to 100 μm with respect to the recording medium.

12. A magneto-optical memory apparatus according to claim 1 wherein said floating magnetic head has a recording frequency of 2 MHz to 10 MHz.

13. A magneto-optical memory apparatus according to claim 1, wherein said floating magnetic head provides an effective magnetic field area to at least enable recording of information, and said floating magnetic head has a floating height of at least a predetermined value with respect to the opposite side of the recording medium.

14. A magneto-optical memory apparatus comprising:
    light beam irradiation means for applying a light to a substrate of a recording medium having at least a recording film formed on the substrate;
    said light irradiation means continuously applying a high power laser beam in a recording mode;
    magnetic field application means arranged on the opposite side of the recording medium to the side of an optical head for applying, in the recording mode, a magnetic field polarity-inverted or intensity-modulated in accordance with recording information to be recorded to the recording film;
    a spacing between said magnetic field application means and said recording medium being kept substantially constant during operation only by an air pressure created between said magnetic field application means and said recording medium by the movement of said recording medium.

15. A magneto-optical memory apparatus according to claim 14 wherein said magnetic field application means has a slider having a surface facing said recording medium and being adapted to float by said air pressure, and magnetic field generation means arranged in said slider to generate the magnetic field.

16. A magneto-optical memory apparatus according to claim 15 wherein the spacing between said magnetic field application means and said recording medium is at least 1 μm.

17. A magneto-optical memory apparatus according to claim 15 wherein said magnetic field generation means has a magnetic field generation area facing said recording medium of 50 μm×50 μm to 1 mm×1 mm.

18. A magneto-optical memory apparatus according to claim 15 wherein said recording medium has a protection coating of 1 μm to 20 μm thick on said recording film.

19. A magneto-optical memory apparatus according to claim 16 wherein the spacing between said magnetic field application means and said recording medium is at least between 1 μm and 100 μm.

20. A magneto-optical memory apparatus according to claim 14, wherein said light beam irradiation means continuously applies a high power laser beam to the recording medium in the recording mode, said magnetic field application means is arranged on the opposite side of the recording medium for applying a magnetic field to the recording film with an effective magnetic field area for recording information, and the spacing between said magnetic field application means and said recording medium is an air float spacing.

21. A magneto-optical disk apparatus comprising:
a rotation mechanism for rotating a magneto-optical disk;
an optical head for applying a light to a substrate of said magneto-optical disk and producing a laser beam of a predetermined power in a recording mode;
a magnetic field application means including modulation means and magnetic head arranged on the opposite side of said magneto-optical disk to the side of said optical head for generating, in the recording mode, a magnetic field substantially perpendicular to the disk plane and modulated with a frequency of at least 2 MHz;
a spacing between said magnetic head and said magneto-optical disk being kept essentially constant only by an air pressure created by the rotation of said magneto-optical disk; and
a transport mechanism for supporting said magnetic head and transporting said magnetic head with said optical head radially of said magneto-optical disk.

22. A magneto-optical disk apparatus according to claim 21 wherein said magnetic head generates a modulation frequency of 2 MHz and 10 MHz.

23. A magneto-optical disc apparatus according to claim 21, wherein said magnetic head provides an effective magnetic field area for enabling recording of information, and said spacing between said magnetic head and said magneto-optical disc is an air float spacing.

* * * * *